United States Patent
Zeng et al.

(10) Patent No.: US 11,306,030 B2
(45) Date of Patent: Apr. 19, 2022

(54) METHOD FOR PREPARING GRAPHENE-CCTO BASED CERAMIC COMPOSITE DIELECTRIC MATERIAL

(71) Applicants: Chongqing Institute of East China Normal University, Chongqing (CN); East China Normal University, Shanghai (CN)

(72) Inventors: Heping Zeng, Chongqing (CN); Yanwei Huang, Chongqing (CN); Jiayang He, Chongqing (CN)

(73) Assignees: CHONGQING INSTITUTE OF EAST CHINA NORMAL UNIVERSITY, Chongqing (CN); EAST CHINA NORMAL UNIVERSITY, Shanghai (CN)

( * ) Notice: Subject to any disclaimer, the term of this patent is extended or adjusted under 35 U.S.C. 154(b) by 0 days.

(21) Appl. No.: 16/910,781

(22) Filed: Jun. 24, 2020

(65) Prior Publication Data
US 2021/0032166 A1 Feb. 4, 2021

(30) Foreign Application Priority Data
Jul. 30, 2019 (CN) .......................... 201910697433.X

(51) Int. Cl.
*C04B 35/462* (2006.01)
(52) U.S. Cl.
CPC .... *C04B 35/462* (2013.01); *C04B 2235/3225* (2013.01); *C04B 2235/3244* (2013.01);
(Continued)

(58) Field of Classification Search
CPC .......... C04B 35/462; C04B 2235/3225; C04B 2235/3244; C04B 2235/3251;
(Continued)

(56) References Cited

FOREIGN PATENT DOCUMENTS

| CN | 107954712 | * | 4/2018 |
| CN | 109734437 | * | 5/2019 |

OTHER PUBLICATIONS

Wang, Shouxu, et al. "Graphene-coated copper calcium titanate to improve dielectric performance of PPO-based composite." Materials Letters 233 (2018): 355-358. (Year: 2018).*

(Continued)

*Primary Examiner* — Karl E Group
*Assistant Examiner* — Cameron K Miller
(74) *Attorney, Agent, or Firm* — Hodgson Russ LLP

(57) ABSTRACT

Provided is a method for preparing a graphene-copper calcium titanate CCTO based ceramic composite dielectric material, which includes: dissolving metal ion sources in respective solvents to obtain respective solutions, and mixing the solutions evenly to obtain a precursor collosol of the CCTO based ceramic; allowing the precursor collosol of the CCTO based ceramic to stand for aging, followed by adding a graphene oxide dispersion to mix with the precursor collosol evenly, drying the resulting mixture to obtain dry precursor powders of the graphene-CCTO based ceramic, which are then grinded into fine powders, followed by irradiating by a low-power laser to obtain graphene-CCTO based ceramic composite powders; and compacting and molding the graphene-CCTO based ceramic composite powders, followed by catalytic synthesis with a high-power laser to obtain the graphene-CCTO based ceramic composite dielectric material.

7 Claims, 1 Drawing Sheet

(52) U.S. Cl.
CPC .......... *C04B 2235/3251* (2013.01); *C04B 2235/3284* (2013.01); *C04B 2235/3293* (2013.01); *C04B 2235/401* (2013.01); *C04B 2235/407* (2013.01); *C04B 2235/422* (2013.01)

(58) Field of Classification Search
CPC .... C04B 2235/3284; C04B 2235/3293; C04B 2235/401; C04B 2235/407; C04B 2235/422
See application file for complete search history.

(56) References Cited

OTHER PUBLICATIONS

CN107954712 machine translation (Year: 2018).*
CN 109734437 machine translation (Year: 2019).*
CNIPA, First Office Action for CN Application No. 201910697433. X, dated May 6, 2021.

* cited by examiner

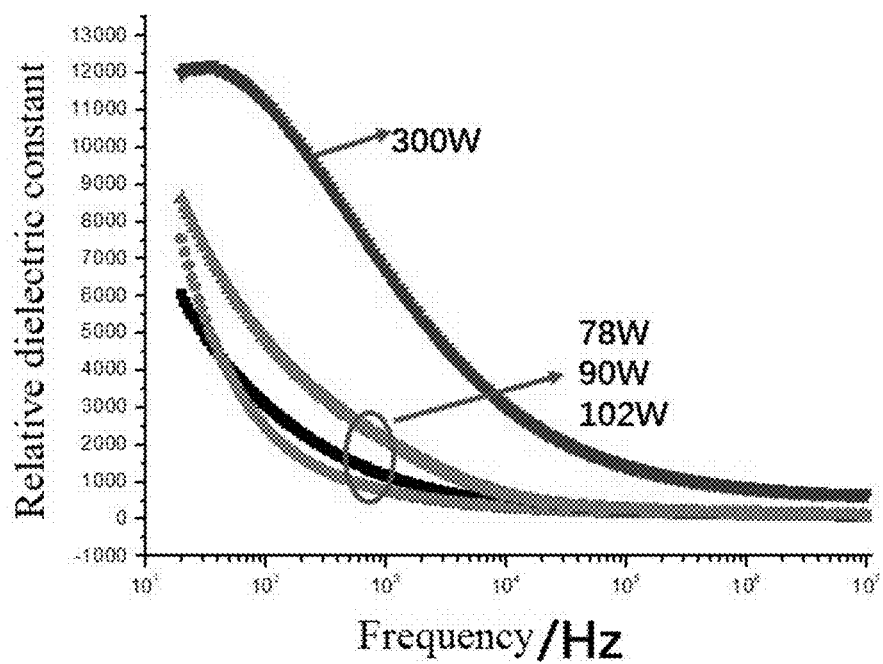

METHOD FOR PREPARING GRAPHENE-CCTO BASED CERAMIC COMPOSITE DIELECTRIC MATERIAL

CROSS-REFERENCE TO RELATED APPLICATION

This application claims priority to and benefits of Chinese Patent Application Serial No. 201910697433.X, filed with the State Intellectual Property Office of P. R. China on Jul. 30, 2019, the entire content of which is incorporated herein by reference.

FIELD

The present disclosure relates to the fields of laser processing technology and energy materials, and more particularly to a method for preparing a graphene-CCTO based ceramic composite dielectric material by rapid laser sintering and a graphene-CCTO based ceramic composite dielectric material prepared thereby.

BACKGROUND

Copper Calcium Titanate ($CaCu_3Ti_4O_{12}$, CCTO for short) is a kind of ceramic material having a giant dielectric constant, whose dielectric constant may reach more than $10^5$ within a wide range of frequency and temperature. With the rapid development of electronic communication industry and new energy industry, research and development on the giant dielectric property of CCTO are getting more and more attention, and CCTO has a wide application prospect, especially in high-density memory devices. CCTO has a perovskite-like structure and belongs to an $ABO_3$ type compound, in which site A is Ca or Cu, and site B is Ti. Since reported in 2000 by Subramanian et al. [M. A. Subramanian, D. Li, N. Duan, B. A. Reisner, A. Sleight, High dielectric constant in $ACaCu_3Ti_4O_{12}$ and $ACaCu_3Ti_4O_{12}$ phase. J. Solid State Chem. 151(2), 323-325 (2000)], CCTO has aroused great interest of researchers. The dielectric constant of CCTO is almost unchanged from room temperature to 600 K, and it has a high dielectric constant in the frequency ranging from 100 Hz to 1000 MHz. CCTO ceramics have many excellent properties, but along with high dielectric constant, the dielectric loss of the CCTO material is also very high, especially at low frequency. For a long time, the over-high dielectric loss of CCTO at low frequency has been a problem that people have been trying to solve, and its giant dielectric property is closely related to raw materials and preparation processes. These problems have seriously hindered the application of CCTO materials in the field of electronic components. At present, there are many explanations for the mechanism of the dielectric property of the CCTO ceramics. Among them, an internal barrier layer capacitor (IBLC) model proposed by Sinclair et al. [Sinclair D C, Adams T B, Morrison F D, et al. $CaCu_3Ti_4O_{12}$: One-step internal barrier layer capacitor. Applied Physics Letters, 2002, 80(12):2153-2155] has been widely recognized, which considers that the ultra-high dielectric constant of the CCTO ceramics is a combined result of the semiconductivity of its internal grains and the insulativity of the grain boundary, in which the insulativity of the grain boundary is directly related to the dielectric loss of the ceramic. Therefore, reducing the conductivity of the grain boundary, i.e., increasing the insulativity of the grain boundary, can effectively reduce the dielectric loss. At present, researches on the modification of CCTO mostly focus on improving the semiconductivity of grains and improving the insulativity of the grain boundary, and the modification of CCTO is mainly realized by doping at site A or site B. Ions doped at the site A are generally trivalent cations, such as $La^{3+}$, $Bi^{3+}$, $Nd^{3+}$, etc., which replace $Ca^{2+}$ at the site A to generate a cation vacancy. Ions doped at the site B are generally pentavalent or hexavalent cations, such as $Nb^{5+}$, $Ta^{5+}$, $Sb^{5+}$, $W^{6+}$, etc., which replace $Ti^{4+}$ at the site B to generate an oxygen vacancy. However, these doping studies have not achieved the purpose of improving the overall performance of the CCTO materials, because the reduction of dielectric loss is usually accompanied by the reduction of dielectric constant, or along with the improvement of dielectric performance, more complex problems are generated in the process.

SUMMARY

Embodiments of the present disclosure seek to solve at least one of the problems existing in the related art to at least some extent.

In an aspect, embodiments of the present disclosure provide a method for preparing a graphene-CCTO based ceramic composite dielectric material, including:

dissolving a titanium ion source, a copper ion source and a calcium ion source in a molar ratio of calcium ion:copper ion:titanium ion=1:3:4 in respective solvents to obtain respective solutions, and mixing the solutions evenly to obtain a precursor collosol of the CCTO based ceramic;

allowing the precursor collosol of the CCTO based ceramic to stand for aging, followed by adding a graphene oxide dispersion in a mass ratio of graphene to the CCTO based ceramic in a range of 1:3 to 1:100 to mix with the precursor collosol evenly, drying the resulting mixture to obtain dry precursor powders of the graphene-CCTO based ceramic, which are then grinded into fine powders, followed by irradiating by a low-power laser having a power of lower than 50 W to obtain graphene-CCTO based ceramic composite powders; and compacting and molding the graphene-CCTO based ceramic composite powders, followed by catalytic synthesis with a high-power laser having a power in a range of higher than 50 W to 1000 W to obtain the graphene-CCTO based ceramic composite dielectric material.

In an aspect, embodiments of the present disclosure provide a graphene-CCTO based ceramic composite dielectric material, which is prepared by the method as described in any embodiments hereinbefore.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 shows dielectric property testing curves of a graphene-CCTO based ceramic composite dielectric material synthesized according to example 2 of the present disclosure.

DETAILED DESCRIPTION

The present disclosure will be described in detail with reference to the following specific embodiments, which are used to help those skilled in the art to further understand the present disclosure, and shall not be construed to limit the present disclosure in any form. It would be appreciated by those skilled in the art that changes and modifications can be made in the embodiments without departing from the spirit of the present disclosure, which also belong to the protection scope of the present disclosure.

Graphene materials not only have high electron mobility, excellent thermal conductivity and high specific surface area, but also have a stable structure and good chemical stability. Therefore, coating ceramic materials with graphene can not only improve inherent properties of the ceramic materials, but also form a physical barrier to prevent the penetration of corrosive media. Moreover, graphene has a large surface, so the performance of ceramic materials can be effectively improved by using less graphene, and the stability of the materials may be further improved so as to make the materials suitable for application in various environments. Further, the ultra-thin graphene not only does not change the quality of the matrix material, but also has high strength and good tribological properties, which shows the feasibility of applying graphene to dielectric materials. In view of this, the present disclosure synthesizes a CCTO based ceramic composite dielectric material coated with graphene by laser catalysis. There are many methods for preparing ceramic dielectric materials, including a solid-phase reaction, a sol-gel method, a co-precipitation method, and a mechanical mixing method, etc., most of which requires long time high-temperature calcination and high-temperature sintering process, and the sintering time is closely related to performances of a target sample. In view of the above problems and shortcomings, the present disclosure proposes a laser catalysis method for quickly and efficiently synthesizing a graphene-CCTO based ceramic composite material, which includes synthesizing a precursor of a CCTO based ceramic first by a similar sol-gel method, followed by adding a graphene oxide dispersion, and then performing laser catalysis to efficiently prepare the graphene-CCTO based ceramic composite material.

In an aspect, embodiments of the present disclosure provide a method for preparing a graphene-CCTO based ceramic composite dielectric material, including:

dissolving a titanium ion source, a copper ion source and a calcium ion source in a molar ratio of calcium ion:copper ion:titanium ion=1:3:4 in respective solvents to obtain respective solutions, and mixing the solutions evenly to obtain a precursor collosol of the CCTO based ceramic;

allowing the precursor collosol of the CCTO based ceramic to stand for aging, followed by adding a graphene oxide dispersion in a mass ratio of graphene to the CCTO based ceramic in a range of 1:3 to 1:100 to mix with the precursor collosol evenly, drying the resulting mixture to obtain dry precursor powders of the graphene-CCTO based ceramic, which are then grinded into fine powders, followed by irradiating by a low-power laser having a power of lower than 50 W to obtain graphene-CCTO based ceramic composite powders; and compacting and molding the graphene-CCTO based ceramic composite powders, followed by catalytic synthesis with a high-power laser having a power in a range of higher than 50 W to 1000 W to obtain the graphene-CCTO based ceramic composite dielectric material.

In an embodiment, the CCTO based ceramic includes copper calcium titanate or copper calcium titanate doped with a metal oxide.

In an embodiment, the metal oxide includes at least one selected from yttrium oxide, ytterbium oxide, zinc oxide, tin oxide, tantalum oxide, hafnium oxide, gadolinium oxide, and zirconium oxide.

In an embodiment, the drying is performed at a temperature in a range of 100 to 180° C.

In an embodiment, the graphene-CCTO based ceramic composite powders are compacted and molded by oil press, cold isostatic pressing or pressing with polyvinyl alcohol (PVA) granulation.

The method according to embodiments of the present disclosure has the following beneficial technical effects.

The method according to embodiments of the present disclosure is fast, efficient, and low in cost, and the composite dielectric material obtained thereby has fine particles, good compactness, giant dielectric property and low dielectric loss, and is suitable for large-scale application in high-density memory devices.

In an aspect, embodiments of the present disclosure provide a graphene-CCTO based ceramic composite dielectric material, which is prepared by the method as described in any embodiments hereinbefore.

In the present disclosure, 50 W is used as a boundary of the power of lasers, higher than which is considered as a high power, while lower than which is considered as a low power.

EXAMPLE 1

Tetrabutyl titanate, copper nitrate, and calcium acetate were used as precursor raw materials, and anhydrous ethanol and glacial acetic acid were used as solvents. First, 0.04 mol of tetrabutyl titanate was weighted and evenly dissolved in anhydrous ethanol under the stirring with a glass rod, followed by adding glacial acetic acid and stirring with a magnetic stirrer for 1 h to prepare a precursor solution containing titanium ions. At the same time, 0.03 mol of $Cu(NO_3)_2 \cdot 3H_2O$ was weighted and dissolved in anhydrous ethanol under the stirring on a magnetic stirrer to obtain a clear and transparent blue solution, which was then added to the precursor solution containing titanium ions to form a clear and transparent blue-green solution. Similarly, a solution containing calcium ions was prepared in proportion to make sure a molar ratio of calcium ion:copper ion:titanium ion of 1:3:4. Specifically, 0.01 mol of $Ca(CH_3COO)_2 \cdot H_2O$ was weighted and dissolved in 40 ml deionized water to obtain a solution containing calcium ions, which was slowly added dropwise to the above blue-green solution containing titanium and copper ions and stirred on a magnetic stirrer for 1 h to obtain a CCTO precursor as a clear and transparent blue-green collosol, i.e., a precursor collosol of CCTO ceramic. After standing for 24 h for aging, the collosol was added with a graphene oxide dispersion in a mass ratio of graphene to the CCTO based ceramic of 1:30, the resulting mixture was subjected to ultrasonic vibration for 60 min and then stirred on a magnetic stirrer for 3 h. The temperature was controlled at 60° C., and solvents was evaporated, followed by drying under a temperature of 110° C. to obtain dry precursor powders of a graphene-CCTO based ceramic composite, which were then grinded into fine powders to obtain a fine powdered precursor of graphene-CCTO based ceramic. The fine powdered precursor was placed in a copper crucible, and irradiated by a laser with a low power of 25 W under the vacuum atmosphere for 20 min, organic solvents and dissolved anions were removed, thereby obtaining graphene-CCTO based ceramic composite powders, which were then compacted and molded by a hydraulic press with a pressure of 15 MPa and a holding time of 10 s, followed by performing high-power laser catalytic synthesis, where the power of the high-power laser was controlled to be 80 W, and the action time was 5 s. The composite dielectric material obtained thereby has an improved density than that of CCTO without addition of graphene, the dielectric constant may reach $10^4$ or more, the lowest dielectric loss is 0.2, and the microscopic particle size is below 100 nm.

EXAMPLE 2

Tetrabutyl titanate, copper nitrate, and calcium acetate were used as precursor raw materials, and anhydrous ethanol and glacial acetic acid were used as solvents. First, 0.04 mol of tetrabutyl titanate was weighted and evenly dissolved in anhydrous ethanol under the stirring with a glass rod, followed by adding glacial acetic acid and stirring with a magnetic stirrer for 1 h to prepare a precursor solution containing titanium ions. At the same time, 0.03 mol of $Cu(NO_3)_2 \cdot 3H_2O$ was weighted and dissolved in anhydrous ethanol under the stirring on a magnetic stirrer to obtain a clear and transparent blue solution, which was then added to the precursor solution containing titanium ions to form a clear and transparent blue-green solution. Similarly, a solution containing calcium ions was prepared in proportion. Specifically, a certain amount of $Ca(CH_3COO)_2 \cdot H_2O$ was weighted and dissolved in 40 ml deionized water to obtain a solution containing calcium ions, which was slowly added dropwise to the above blue-green solution containing titanium and copper ions and stirred on a magnetic stirrer for 1 h to obtain a CCTO precursor as a clear and transparent blue-green collosol, i.e., a precursor collosol of CCTO ceramic. After standing for 36 h for aging, the collosol was added with a graphene oxide dispersion in a mass ratio of graphene to the CCTO based ceramic of 1:50, the resulting mixture was subjected to ultrasonic vibration for 30 min and then stirred on a magnetic stirrer for 2 h. The temperature was controlled at 70° C., and solvents was evaporated, followed by drying under a temperature of 100° C. to obtain dry precursor powders of a graphene-CCTO based ceramic composite, which were then grinded into fine powders to obtain a fine powdered precursor of graphene-CCTO based ceramic. The fine powdered precursor was placed in a copper crucible, and irradiated by a laser with a low power of 20 W under the vacuum atmosphere for 30 min, organic solvents and dissolved anions were removed, thereby obtaining graphene-CCTO based ceramic composite powders, which were then compacted and molded by isostatic pressing with a pressure of 80 MPa and a holding time of 3 min, followed by performing high-power laser catalytic synthesis, where the power of the high-power laser was controlled to be 78 W, 90 W, 102 W or 300 W, and the action time was 5 s. FIG. 1 shows the dielectric property testing curves of CCTO based ceramic composites coated with graphene synthesized by laser catalysis. The composite dielectric material obtained thereby has an improved density than that of CCTO without addition of graphene, the dielectric constant may reach $10^4$ or more, the lowest dielectric loss is 0.5, and the microscopic particle size is below 100 nm.

EXAMPLE 3

Tetrabutyl titanate, copper nitrate, and calcium acetate were used as precursor raw materials, and anhydrous ethanol and glacial acetic acid were used as solvents. First, 0.04 mol of tetrabutyl titanate was weighted and evenly dissolved in anhydrous ethanol under the stirring with a glass rod, followed by adding glacial acetic acid and stirring with a magnetic stirrer for 1 h to prepare a precursor solution containing titanium ions. At the same time, 0.03 mol of $Cu(NO_3)_2 \cdot 3H_2O$ was weighted and dissolved in anhydrous ethanol under the stirring on a magnetic stirrer to obtain a clear and transparent blue solution, which was then added to the precursor solution containing titanium ions to form a clear and transparent blue-green solution. Similarly, a solution containing calcium ions was prepared in proportion. Specifically, a certain amount of $Ca(CH_3COO)_2 \cdot H_2O$ was weighted and dissolved in 40 ml deionized water to obtain a solution containing calcium ions, which was slowly added dropwise to the above blue-green solution containing titanium and copper ions and stirred on a magnetic stirrer for 1 h to obtain a CCTO precursor as a clear and transparent blue-green collosol, i.e., a precursor collosol of CCTO ceramic. After standing for 24 h for aging, the collosol was added with a graphene oxide dispersion in in a mass ratio of graphene to the CCTO based ceramic of 1:5, the resulting mixture was subjected to ultrasonic vibration for 35 min and then stirred on a magnetic stirrer for 2 h. The temperature was controlled to a proper value, and solvents was evaporated, followed by under a temperature of 100° C. to obtain dry precursor powders of a graphene-CCTO based ceramic composite, which were then grinded into fine powders to obtain a fine powdered precursor of graphene-CCTO based ceramic. The fine powdered precursor was placed in a copper crucible, and irradiated by a laser with a low power of 15 W under the air atmosphere for 20 min, organic solvents and dissolved anions were removed, thereby obtaining graphene-CCTO based ceramic composite powders, which were then compacted and molded by isostatic pressing with a pressure of 80 MPa and a holding time of 3 min, followed by performing high-power laser catalytic synthesis, where the power of the high-power laser was controlled to be 90 W, and the action time was 5 s, to finally obtain a graphene-CCTO based ceramic composite dielectric material. The obtained composite dielectric material has an improved density than that of CCTO without addition of graphene, the dielectric constant may reach $3 \times 10^4$ or more, the lowest dielectric loss is 0.3, and the microscopic particle size is below 100 nm.

Although specific examples have been shown and described above, it would be appreciated by those skilled in the art that the present disclosure is not limited to the above embodiments, and changes, alternatives, and modifications can be made in the embodiments without departing from spirit, principles and scope of the present disclosure.

EXAMPLE 4

Tetrabutyl titanate, copper nitrate, calcium acetate, and zinc acetate were used as precursor raw materials, and anhydrous ethanol and glacial acetic acid were used as solvents. First, 0.04 mol of tetrabutyl titanate was weighted and evenly dissolved in anhydrous ethanol under the stirring with a glass rod, followed by adding glacial acetic acid and stirring with a magnetic stirrer for 1 h to prepare a precursor solution containing titanium ions. At the same time, 0.01 mol of $Cu(NO_3)_2 \cdot 3H_2O$ was weighted and dissolved in anhydrous ethanol under the stirring on a magnetic stirrer to obtain a clear and transparent blue solution, which was then added to the precursor solution containing titanium ions to form a clear and transparent blue-green solution. Similarly, a solution containing calcium ions was prepared in proportion. Specifically, 0.01 mol of $Ca(CH_3COO)_2 \cdot H_2O$ was weighted and dissolved in 40 ml deionized water to obtain a solution containing calcium ions. At the same time, 0.02 mol of $Zn(CH_3COO)_2 \cdot 2H_2O$ was weighted and dissolved in 30 ml deionized water to obtain a solution containing zinc ions. Afterwards, the solution containing calcium ions and the solution containing zinc ions were slowly added dropwise to the above blue-green solution containing titanium and copper ions and stirred on a magnetic stirrer for 1 h to obtain a CCTO precursor as a clear and transparent blue-green collosol, i.e., a precursor collosol of CCTO ceramic. After standing for 24 h for aging, the collosol was added with a graphene oxide dispersion in a mass ratio of graphene to the CCTO based ceramic of 1:50, the resulting mixture was subjected to ultrasonic vibration for 60 min and then stirred on a magnetic stirrer for 3 h. The temperature was controlled at 60° C., and solvents was evaporated, followed by drying under a temperature of 110° C. to obtain dry precursor powders of a graphene-CCTO based ceramic composite, which were then grinded into fine powders to obtain a fine powdered precursor of graphene-CCTO based ceramic. The fine powdered precursor was placed in a copper crucible, and irradiated by a laser with a low power of 30 W under the vacuum atmosphere for 15 min, organic solvents and dissolved anions were removed, thereby obtaining graphene-CCTO based ceramic composite powders, which were then compacted and molded by a hydraulic press with a pressure of 15 MPa and a holding time of 10 s, followed by performing high-power laser catalytic synthesis, where the power of the high-power laser was controlled to be 80 W, and the action time was 5 s, obtaining zinc doped graphene-CCTO based ceramic composite.

What is claimed is:

1. A method for preparing a graphene-copper calcium titanate CCTO based ceramic composite dielectric material, comprising:

dissolving a titanium ion source, a copper ion source and a calcium ion source in respective solvents to obtain respective solutions, and mixing the solutions evenly to obtain a precursor collosol of the CCTO based ceramic;

allowing the precursor collosol of the CCTO based ceramic to stand for aging, followed by adding a graphene oxide dispersion in a mass ratio of graphene to the CCTO based ceramic in a range of 1:3 to 1:100 to mix with the precursor collosol evenly, drying the resulting mixture to obtain dry precursor powders of the graphene-CCTO based ceramic, which are then ground into fine powders, followed by irradiating by a low-power laser having a power of lower than 50 W to obtain graphene-CCTO based ceramic composite powders; and compacting and molding the graphene-CCTO based ceramic composite powders, followed by catalytic synthesis with a high-power laser having a power in a range of higher than 50 W to obtain the graphene-CCTO based ceramic composite dielectric material.

2. The method according to claim 1, wherein the CCTO based ceramic comprises copper calcium titanate or copper calcium titanate doped with a metal oxide.

3. The method according to claim 2, wherein the metal oxide comprises at least one selected from yttrium oxide, ytterbium oxide, zinc oxide, tin oxide, tantalum oxide, hafnium oxide, gadolinium oxide, and zirconium oxide.

4. The method according to claim 1, wherein the drying is performed at a temperature in a range of 100 to 180° C.

5. The method according to claim 1, wherein the graphene-CCTO based ceramic composite powders are compacted and molded by oil press, cold isostatic pressing or pressing with PVA granulation.

6. The method according to claim 1, wherein the low-power laser has a power in a range of 15 to 25 W.

7. The method according to claim 1, wherein the high-power laser has a power in a range of 78 to 300 W.

* * * * *